Sept. 5, 1967 E. J. JOHNSTON 3,339,258
PRESSURE ROLL AND METHOD OF MAKING
Filed March 26, 1965 2 Sheets-Sheet 1

Inventor:
Edward J. Johnston
By John J. Kowalik
Atty.

Sept. 5, 1967 E. J. JOHNSTON 3,339,258
PRESSURE ROLL AND METHOD OF MAKING
Filed March 26, 1965 2 Sheets-Sheet 2

Inventor,
Edward J. Johnston
By John J. Kowalik
Atty.

United States Patent Office 3,339,258
Patented Sept. 5, 1967

3,339,258
PRESSURE ROLL AND METHOD OF MAKING
Edward J. Johnston, La Grange, Ill., assignor to International Harvester Company, a corporation of Delaware
Filed Mar. 26, 1965, Ser. No. 443,031
7 Claims. (Cl. 29—121)

ABSTRACT OF THE DISCLOSURE

Placing bendable strips on a cylinder and twisting the strips while holding them equally spaced and slidably embracing them intermediate their ends against the cylinder.

---

The present invention relates to a pressure roll and method of making it.

A broad object of the invention is to provide a novel splined metal pressure roll and a novel method of making it.

Such a pressure roll may be used in any of a number of installations, including a hay conditioner upon which the folowing disclosure is based. Such a device is merely representative, and the invention is not limited thereto. In such a hay conditioner, or hay crusher, a pair of cooperating pressure rolls are provided and the hay is introduced between those rolls which then crush the stalks of the hay to enable faster drying and curing of the stalks so that they will dry and cure in substantially the same period of time that the smaller and thinner portions, such as the leaves, dry and cure.

In such machines one of the pressure rolls commonly has been and is a metal roll with helical splines thereon but the methods heretofore known for producing such a roll were extremely expensive because it was formed by routing or milling grooves in a uniform cylinder to form splines, or welding formed bars to the body of the roll.

A broad object of the invention is to provide a metal roll with helical splines thereon and a new method of producing such a roll which utilizes a uniform cylindrical tube which provides the body of the roll and applying twisted splines thereto and securing them in place.

A more specific object is to provide a new roll of the foregoing character and a new method of making it wherein the splines are applied to the tube and then twisted into the desired shape thereon, whereby the same tube to which they are to be applied, constitutes the matrix for controlling the shaping of the splines, the splines then being welded to the tube when in place thereon following the shaping operation.

Still another object is to provide a pressure roll of the foregoing character wherein the splines are constituted by channel members arranged with their open sides presented to the tube and providing a novel means for balancing the roll by enabling introduction of selected balancing weight members in the spaces formed by the channels.

Other objects and advantages of the invention will appear from the following detailed description taken in conjunction with the accompanying drawings wherein.

Figure 1:
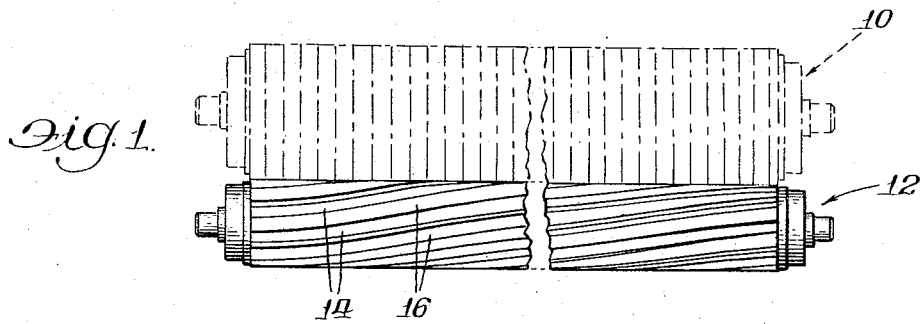
FIGURE 1 is an elevational view of a pair of rolls of the character commonly used in hay conditioners, and including a metal splined roll of the type to which the present invention is applicable.

Referring now in detail to the accompanying drawings attention is directed first to FIGURE 1 showing a pair of rolls 10 and 12 similar to the rolls of FIGURE 12 in Heth Patent No. 2,921,426 issued Jan. 19, 1960. As described in that patent the upper roll 10 includes a plurality of rubber impregnated discs and the lower roll 12 is metallic having spiral grooves, these grooves identified at 14 being formed between splines 16. The rolls are utilized for crushing hay stalks, for example, introduced therebetween. The present invention concerns a method of forming these splines.

Heretofore such metal pressure rolls having helical splines have been formed by a routing or milling operation in which grooves were cut, leaving the desired splines, or by applying formed bars to the body of the roll. These methods of forming the splines are of course extremely expensive, and the present invention overcomes that serious obstacle, providing the desired pressure roll which can be made much more quickly and with less expensive equipment, resulting in a much less expensive end product.

In the practice of the present invention a metal tube 18, of steel for example, of the desired dimensions is utilized. This tube is uniformly cylindrical with a smooth outer surface. The splines 16 are formed by strips or spline elements in the shape of channels originally separate from the tube and applied thereto, these spline elements being straight before the shaping operation and applied to the tube in an equally spaced relationship parallel with the longitudinal central axis of the tube, and with their open sides turned inward and the flanges 20 engaging the tube and the web 22 forming the outer element of the completed spline.

Figure 3:
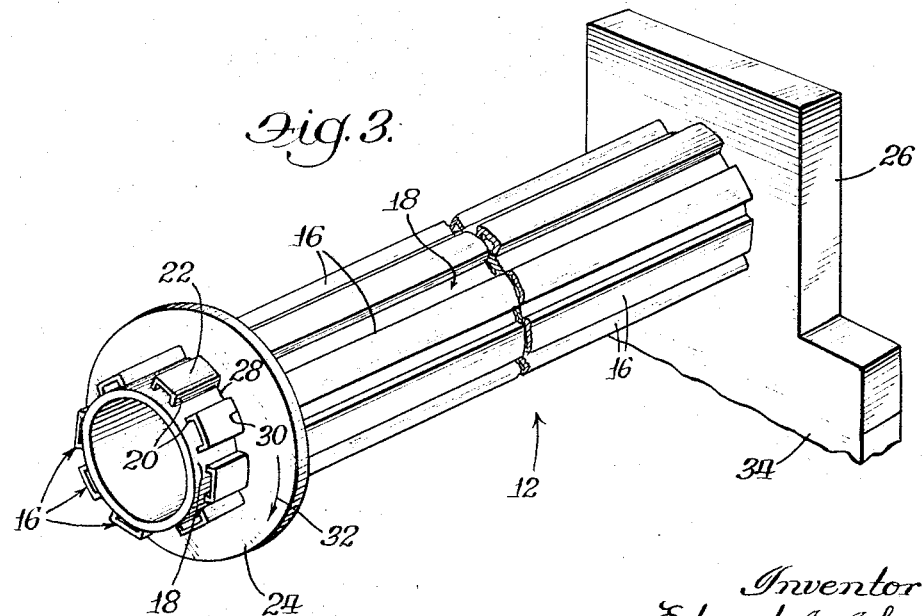
FIGURE 3 is a perspective view of the tube and spline elements fitted thereto and before the spline elements are shaped, and showing diagrammatically a pair of members utilized in the shaping operation.

In the actual practice of the invention in applying the channels to the tube, a pair of forming fixtures 24 and 26 may be utilized, as shown indicatively in FIGURE 3. The forming fixture 24 and 26 are in the form of annular members having inwardly directed lugs 28 forming notches 30 therebetween. These fixtures receive the ends of the tube and retain the tube in place and the channels 16 may then be inserted through the notches 30 in the two fixtures, which are of course aligned for that purpose. The forming fixtures 24, 26 then serve to retain the tube, as well as the channels, in the desired assembled position.

In the next step of the operation, relative rotational movement is imparted to the forming fixtures 24, 26 such as by rotating the fixture 24 in one direction, while retaining the fixture 26 stationary. The direction of rotation in the assumed example is clockwise as viewed in FIGURE 3 and indicated by the arrow 32.

Figure 4:
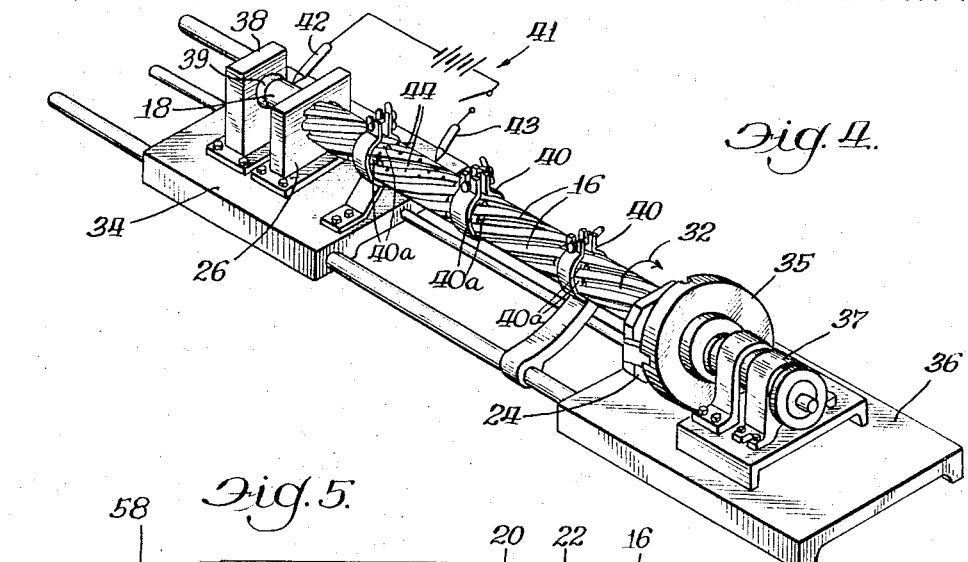
FIGURE 4 is a perspective view of the tube and spline elements mounted in a device utilized for shaping the spline elements on the tube, and after they have been shaped.

The fixtures 24 and 26 are mounted in or incorporated in a suitable jig or machine for producing the desired rotational movement of the plate 24. FIGURE 4 shows a suitable arrangement for incorporating these fixtures in such a machine where the fixture 26 is mounted stationarily on a table 34. The fixture 24 is driven by a rotatable chuck 35 mounted on a table 36 and driven by a suitable means such as an electric motor 37 operating through a speed reducer (not shown). A center fixture 38 is mounted on the table 34 and has a centering element 39 engaging the end of the tube 18. Preferably the table 34 is adjustable toward and from the table 36 to accommodate rolls of different lengths.

Rotation of the fixture 24 as above mentioned, against the stationary holding by the fixture 26 produces the twisting action of the channels to produce the intended helical shape. The extent of this twisting, angularly of the tube, may of course be any practical extent desired.

A plurality of clamps 40 surround the roll in clamping engagement with the spline elements at spaced intervals therealong to prevent outward bowing of the ribs or splines and to hold the splines in proper position during the twisting operation and until they are secured to the tube (in a manner referred to below). The clamps 40 may be mounted on the base, as in the case of the outer ones, or free-floating as in the case of the center one. These clamps may hold short gauge blocks 40a, 40a between the ribs to maintain the ribs equally spaced during the twisting operation.

The tube 18 in this operation constitutes a matrix for shaping the channels, the channels therefore necessarily assuming the perfect shape as determined by the surface of the tube. After the channels are in the intended and desired shape, the rotation of the fixture 24 is terminated and then the channels are secured to the tube preferably by spot welding. FIGURE 4 also indicates this operation, including a welding circuit indicated generally at 41 and having electrodes 42 and 43. One of the electrodes, 42, is applied for example to one end of the tube while the other, 43, is applied to the channels at the locations intended to spot weld them to the tube. Such locations are indicated at 44, which are of such number and so located as to produce the desired holding effect. Preferably the electrode 43 is applied to the channels at the side edges thereof so as to localize the welding effect directly through the flanges for intensifying the spot welding operation. Upon completion of the welding operation, the roll, now completed in so far as the application of the splines is concerned, may be removed from the jig or machine.

Figure 2:
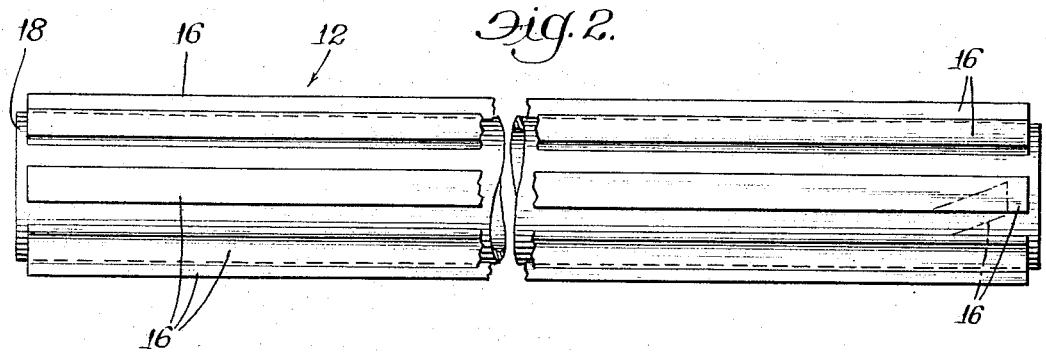
FIGURE 2 is a side elevational view of a tube and a plurality of spline elements fitted thereto in straight form and before the shaping operation is performed on the spline elements to form helical splines.

The splines 16 in the twisting or shaping action, are foreshortened in axial direction relative to the constant length of the tube 18. Consequently splines or channels 16 are selected as to length so that they will be of the desired axial projection in the roll after the twisting or shaping operation is completed. It is desired that the splines be shorter then the tube, in the finished roll, in order to incorporate finishing elements in the end of the roll as described below. FIGURE 2 shows the splines in full lines terminating relatively close to the end of the tube while the dot-dash line indicates the ends of the splines spaced a greater distance from the end of the tube, this greater spacing being caused by the twisting action, as stated above.

Preferably the ends of the channel strips 16 are cut at an angle so that when they assume their helical shape, the ends thereof, at each end of the roll, lie in a common plane perpendicular to the axis of the roll. It is also within the broad concept of the invention to cut off the ends of the splines after they are shaped and secured to the tube.

Figure 5:
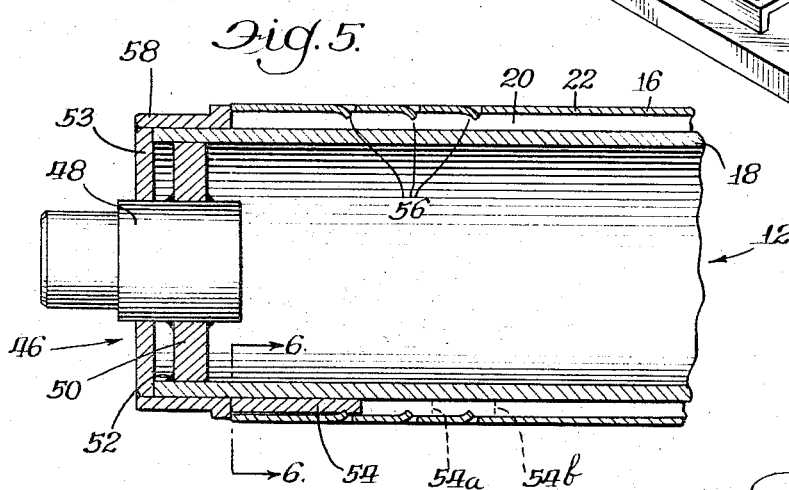
FIGURE 5 is an axial sectional view of one end of a roll made according to the present invention.
Figure 6:
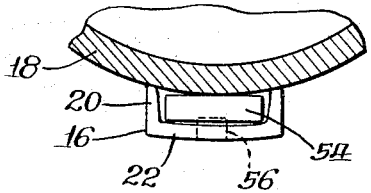
FIGURE 6 is a sectional view taken at line 6—6 of FIGURE 5.

FIGURE 5 shows a finished roll including the tube and splines formed as described above, together with end fittings to complete the roll for mounting in a machine. This illustration together with that of FIGURE 6 also shows a novel means for balancing the roll. One such end fitting as indicated at 46 includes a hub member 48 and an annular disc 50 surrounding it and welded thereto. The disc may be first welded to the hub member to form an assembly, and the assembly then fitted within the end of the tube 18 and welded thereto as indicated at 52. An outer closure plate 53 may be utilized also if desired.

For providing balancing of the roll as referred to above, a balancing weight member 54 is inserted in the end of one of the channel splines 16 of a selected weight according to the desired weight compensation to be produced, a number of weight members 54 of various weights being provided for that purpose. The web 22 of each of the channel splines at one end, or at both ends if desired, is provided with a plurality of tabs 56 struck inwardly therefrom which are effective for retaining the weight members 54 in position. These tabs 56 may be of the desired number and spaced at appropriate spacings along the length of the channel to respectively engage weight members 54 of different lengths, longer ones being indicated at 54a and 54b.

After the weight member 54 is put in position, a retaining collar 58 is fitted on the end of the tube 18 in butting engagement with the ends of the splines. This collar may be secured in position as by welding.

Figure 7:
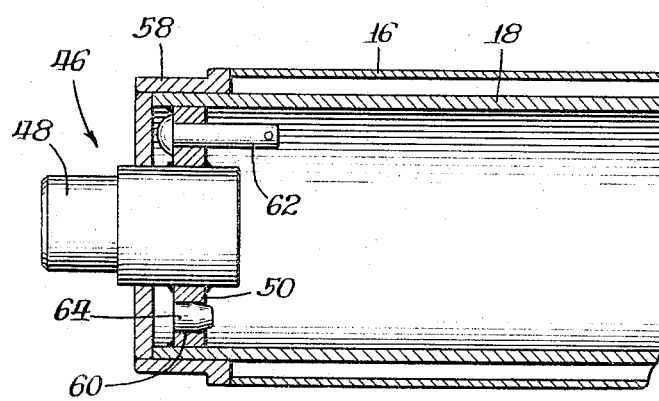
FIGURE 7 is a view similar to FIGURE 5 but showing an alternative balancing arrangement.

Although the foregoing arrangement provided for balancing the roll is novel and convenient, the invention is not limited to such balancing arrangement. FIGURE 7 shows a balancing means including an annular disc 50 provided with a plurality of apertures and a headed pin 62 which is inserted in one of those apertures according to the weight compensation to be produced. This pin may be tack welded to the disc 50. The remaining apertures 60 may be filled with convenient plugs 64 of insignificant weight or left blank.

The foregoing method is extremely simple and rapid, it eliminates the necessity for expensive equipment such as routing or milling machines, and eliminates other expensive methods, with a consequent end product of extremely low cost.

While I have herein disclosed a preferred form of the invention it will be understood that certain changes may be made therein within the scope of appended claims.

I claim:

1. A pressure roll comprising a cylindrical tube, a plurality of strips of channel shape applied to the tube with their flanges directed inwardly and in engagement with the tube and defining axially elongated apertures, the strips being connected to the tube, the foregoing constituting a roll having a plurality of circumferentially spaced splines of helical shape, and weight-balancing members in certain of said apertures defined by the splines at such position as to provide a balanced distribution of weight of the roll around its central longitudinal axis.

2. The invention set out in claim 1 wherein the splines have inwardly extending tabs in the elements of the splines constituting the webs of the channels adjacent the ends of the splines whereby to retain a balancing member in any of the splines inserted therein for balancing purposes.

3. A pressure roll comprising a steel cylindrical tube, a plurality of steel strips of channel shape in cross section and together in the form of a helix, applied to the tube with their flanges turned inwardly and engaging the tube, the strips being welded to the tube, whereby to provide a roll member having circumferentially spaced helical splines, weight-balancing member in any of the spaces formed by the channel members of the splines of such weight and at such location as to produce even distribution of weight about the central longitudinal axis of the tube, the splines being shorter than the tube and at both ends thereof being spaced inwardly from the ends of the tube, collars fitted on the ends of the tube in engagement with the ends of the splines and secured to the tube, and hub members secured in each end of the tube, each hub member including a central hub element and a surrounding annular plate, the annular plate being secured to the hub element and these two members together constituting an end fitting in the tube and the outer edge of the plate being secured to the tube.

4. A method of forming a pressure roll comprising the steps of laying a plurality of elongated narrow, bendable strips about a cylindrical tube in contact engagement therewith and in position extending axially of the tube, slidably embracing the strips intermediate their ends to hold them against the tube, locating gauge means between the strips to hold them in accurate spaced relation, twisting the strips into helical form about the tube and in the step of so twisting the strips utilizing the tube as a matrix about which the strips are twisted, and then securing the strips to the tube in their helical form to retain the strips in their helical form on the tube, thereby forming helical splines on the tube in substantially uniformly spaced apart relation circumferentially thereof.

5. A method of forming a pressure roll comprising utilizing a cylindrical metal tube, providing a plurality of straight metal channel strips having flanges and an intervening web, placing the strips on the tube in mutually spaced apart relation circumferentially thereof and in straight position axially of the tube, and further in which the strips are so placed that the flanges thereof are turned inwardly and they engage the tube, disposing means between the strips intermediate their ends to maintain them in substantially uniformly spaced relation while the strips are being twisted, twisting the strips into helical shape on the tube while simultaneously slidably holding them intermediate their ends against the tube to prevent the strips from distorting outwardly and in so twisting them untilizing the tube as a matrix for so shaping the strips, and thereafter spot welding the strips to the tube at a plurality of points on each strip in such position that the weld points occur in the flanges of the strips, thereby providing a roll with helical splines spaced apart circumferentially therearound.

6. A method of forming a pressure roll comprising utilizing a cylindrical tube, providing a plurality of straight strips of channel shape, applying the strips to the tube in position axially of the tube with the flanges of the channels in engagement with the tube, twisting the strips into helical shape on the tube, securing the strips to the tube to form a roll having helical splines spaced circumferentially therearound, and weight-balancing the roll thus formed by inserting a weight member in the space within selected splines thus formed, of the proper weight and at the proper location circumferentially of the roll to balance the roll.

7. A method of forming a pressure roll having a cylindrical tubular core and peripheral strips comprising; preshaping the strips with ends acutely angled to the longitudinal axes of the strips, applying the strips to the tubular core in straight position axially of the tubular core, twisting the strips on the tubular core into helical shape and utilizing the tubular core as a matrix for so twisting the strips, and securing the strips in their helical form to the tubular core, thereby producing a pressure roll having circumferentially spaced helical ribs, the preshaping of the ends of the strips being such that when they are in their twisted position, the end surfaces of all of the strips at each end lie in a common plane perpendicular to the axis of the roll.

References Cited
UNITED STATES PATENTS 2,338,847   1/1944   Hansen _____ 29—148.4

WILLIAM I. PRICE, *Primary Examiner.*